Sept. 15, 1936.   J. W. JAMBURA   2,054,503
COMBINATION TOOL
Original Filed Aug. 21, 1934
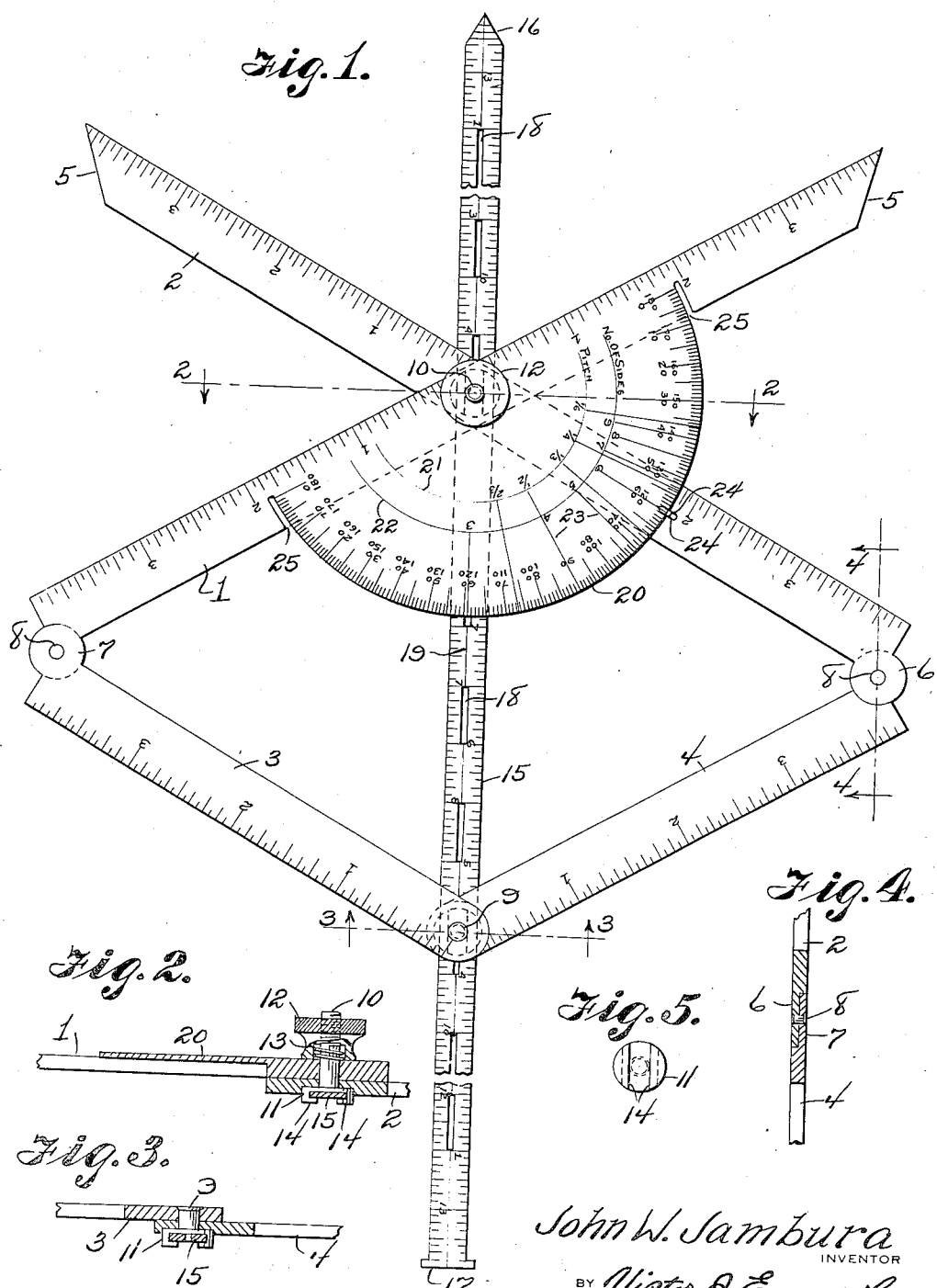
John W. Jambura
INVENTOR
BY Victor J. Evans & Co.
ATTORNEY Patented Sept. 15, 1936

2,054,503

UNITED STATES PATENT OFFICE 2,054,503

COMBINATION TOOL

John William Jambura, Prairie du Chien, Wis.

Application August 21, 1934, Serial No. 740,820
Renewed July 6, 1936

3 Claims. (Cl. 33—75)

The object of this invention is to provide a simple, inexpensive and accurate tool which may be used for various purposes and which will be of service to draftsmen, students, architects, mechanics and others. A tool embodying the invention is illustrated in the accompanying drawing and will be hereinafter fully described, the novel features being particularly defined in the appended claims.

In the drawing:

Figure 1 is a plan view of the tool in open position.

Figure 2 is a section on the line 2—2 of Figure 1.

Figure 3 is a section on the line 3—3 of Figure 1.

Figure 4 is a section on the line 4—4 of Figure 1.

Figure 5 is a detail plan view of a clamp screw.

The main portion or frame of the instrument comprises four bars or arms 1, 2, 3 and 4 which are calibrated in inches as shown. The arms 1 and 2 are each tapered or beveled at one end, 5, and at the opposite ends are provided with circular extensions 6 which overlap or underlap similar extensions 7 on the arms or bars 3 and 4, respectively. Pivot rivets 8 are fitted centrally through the overlapped extensions so that the arm 1 will be pivoted to the arm 3 and the arm 2 will be pivoted to the arm 4. The inner end of the arm 3 overlaps the inner end of the arm 4 and is pivoted thereto by a rivet 9, the arm 4 having a circular recess in its under side to accommodate the head of the rivet, as shown in Figure 3. The arm 1 is disposed on and crosses the arm 2 and a stud or pin 10 is fitted through said arms at their centers, the circular head 11 of the stud fitting in a recess therefor in the under side of the arm 2, as shown in Figure 2. The upper end of the stud projects above the arm 1 and is threaded to receive a nut 12 which may be turned home against the arm to hold the several arms in a set position, it being noted that the nut is hollow to house a spring 13 which resists loosening movement of the nut but yields readily to a positive force to permit shifting or readjustment of the implement. The heads of the stud 10 and the rivet 9 are provided with parallel flanges 14 which are undercut, as clearly shown in Figures 2 and 3, to receive a gage bar or rule 15 calibrated in inches and having one end, 16, pointed and the opposite end, 17, square, the pointed end being between the pointed ends 5 of the arms 1 and 2. The rule 15 is constructed with central longitudinal slots 18 and has a central longitudinal line 19 marked thereon between the slots. The slots and lines cooperate with the graduations of a protractor 20 in a manner which will be later described.

The protractor 20 is formed on the inner edge of the arm 1 and is graduated in degrees along its arcuate edge which is concentric with the stud 10. Semicircles 21 and 22 are marked on the surface of the protractor and radial lines 23 are drawn at intervals from the edge of the protractor to these semicircles and proper numerals are inscribed at the ends of the lines, the numerals along the inner semicircle being indicative of the pitch of roof timbers and the numerals along the outer semicircle denoting the number of sides a figure will have when its sides are drawn at the angle indicated by the respectively associated radii. An indicator or index finger 24 is provided on the arm 2 and projects over the edge of the protractor to facilitate the reading of a measured angle and a line 19 or a slot 18 will bisect the angle and therefore act as indicators to ascertain half of the angle. Notches 25 are formed in the edge of the protractor arm 1 immediately adjacent the outer ends of the protractor to accommodate the indicator when the device is fully closed and in other positions of the parts.

When the tool is collapsed, the protractor arm 1 will lie over the arm 2 and the arms 3 and 4 will be alined and abut the arms 1 and 2, the protractor projecting over and across the arms 3 and 4. The rule 15 will then project from the arms 1 and 2 at a right angle thereto and the tool may then be employed as a T-square. If the rule 15 be withdrawn, the tool may be stored in a small space. The arms 2 and 3 are always parallel and the arms 1 and 4 are always parallel, so that the angle defined by the arms 1 and 2 will always be equal to the angle defined by the arms 3 and 4 and the rule 15 will always bisect those angles. When the tool is closed, the rule 15 constitutes a convenient marking or depth gage and it may be slid from the flanges entirely or partly to avoid interference from the folded arms. The pointed ends of the arms 1 and 2 permit the arms to be conveniently used as dividers and compound dividers will be provided by extending the rule 15 until its pointed end alines with the pointed ends of the arms. The accuracy of the pitch of roof rafters may be readily determined by resting the extended arms 1, 2 upon the upper meeting ends of the rafters. The tool may be used in a variety of other ways which will readily suggest themselves as the occasion arises.

Having described my invention, what I claim is:

1. A tool comprising a plurality of pivotally connected arms, a semi-circular protractor having graduations thereon and carried by one of the arms concentric with the pivotal connection between said arm and the adjacent arm, and a gage bar passing under the protractor and supported by alined pivots of the arms, the gage bar having medial longitudinally disposed means thereon to cooperate with the graduations of the protractor.

2. A tool comprising a plurality of pivotally connected arms, opposite arms being always parallel, alined pivots connecting the non-parallel arms having overhanging parallel flanges on their heads, and a gage bar slidably mounted in said flanges.

3. A tool comprising a plurality of pivotally connected arms, a semi-circular protractor carried by one of the arms concentric with the pivotal connection between said arm and the adjacent arm, and an indicator on said adjacent arm cooperating with the protractor, the protractor carrying arm having notches extending into one side edge thereof and disposed to provide a notch at each opposite end of the protractor for the passage of the indicator therein.

JOHN WILLIAM JAMBURA.